US010788666B2

United States Patent
Haruyama et al.

(10) Patent No.: US 10,788,666 B2
(45) Date of Patent: Sep. 29, 2020

(54) HEAD-UP DISPLAY DEVICE AND LENS UNIT

(71) Applicant: NIPPON SEIKI CO., LTD., Niigata (JP)

(72) Inventors: Hiroteru Haruyama, Niigata (JP); Daichi Kanetoku, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 74 days.

(21) Appl. No.: 16/070,665

(22) PCT Filed: Jan. 16, 2017

(86) PCT No.: PCT/JP2017/001166
§ 371 (c)(1),
(2) Date: Jul. 17, 2018

(87) PCT Pub. No.: WO2017/126455
PCT Pub. Date: Jul. 27, 2017

(65) Prior Publication Data
US 2019/0018241 A1    Jan. 17, 2019

(30) Foreign Application Priority Data
Jan. 19, 2016    (JP) .................................. 2016-007850

(51) Int. Cl.
*G02B 27/01*    (2006.01)
*G02B 3/00*    (2006.01)
*B60K 35/00*    (2006.01)

(52) U.S. Cl.
CPC .......... *G02B 27/0101* (2013.01); *B60K 35/00* (2013.01); *G02B 3/00* (2013.01);
(Continued)

(58) Field of Classification Search
CPC ........ G02B 3/0056; G02B 3/08; G02B 3/005; G02B 3/0062; G02B 3/0068;
(Continued)

(56) References Cited

U.S. PATENT DOCUMENTS

2004/0149998 A1*  8/2004  Henson ................ G02B 6/3672
                                                257/98
2004/0262053 A1* 12/2004  Ludewig .................. G02B 6/04
                                                180/23
(Continued)

FOREIGN PATENT DOCUMENTS

JP   2009-122654 A   6/2009
JP   2011-076832 A   4/2011
(Continued)

OTHER PUBLICATIONS

Search Report issued in corresponding International Patent Application No. PCT/JP2017/001166, dated Mar. 21, 2017.

*Primary Examiner* — Thomas K Pham
*Assistant Examiner* — Sharrief I Broome
(74) *Attorney, Agent, or Firm* — McDermott Will & Emery LLP

(57) ABSTRACT

A head-up display device includes: a plurality of light sources arrayed in matrix in a Y-direction and a Z-direction; and a lens unit in which a convex lens portion for collecting radiant light radiated from the light sources is formed opposing each light source. The plurality of light sources are arranged at an interval A in a Z-direction and at an interval B, which is smaller than the interval A, in the Y-direction. The lens unit has a first connection portion and second connection portions formed at boundaries of the adjacent convex lens portions. The first connection portion extends in the Y-direction, and the second connection portions extend in the Z-direction. A width of a short direction of the first
(Continued)

connection portion is smaller than a width of a short direction of the second connection portions

12 Claims, 14 Drawing Sheets

(52) U.S. Cl.
CPC ......... *G02B 3/0056* (2013.01); *G02B 3/0075* (2013.01); *G02B 27/01* (2013.01); *G02B 27/0149* (2013.01); *B60K 2370/1529* (2019.05); *B60K 2370/336* (2019.05); *G02B 2027/0118* (2013.01)

(58) Field of Classification Search
CPC .... G02B 3/0012; G02B 3/0031; G02B 1/041; G02B 30/27; G02B 3/0043; G02B 3/0087; G02B 13/006; G02B 13/0085; G02B 19/0014; G02B 19/0028; G02B 1/04; G02B 27/0018; G02B 3/00; G02B 3/0018; G02B 13/004; H01L 27/14627; H01L 2924/00; H01L 27/14685; H01L 31/0543; H01L 2224/48091; H01L 2924/0002; H01L 2924/12036; H01L 2924/12042; H01L 31/02325; H01L 27/14618; H01L 27/146
See application file for complete search history.

(56) References Cited

U.S. PATENT DOCUMENTS

| | | | |
|---|---|---|---|
| 2005/0134527 A1* | 6/2005 | Ouderkirk | G02B 6/4249 345/32 |
| 2011/0075434 A1 | 3/2011 | Kurokawa | |
| 2013/0094092 A1* | 4/2013 | Imahori | G02B 5/18 359/633 |
| 2014/0368544 A1* | 12/2014 | Kobayashi | G02B 27/0101 345/633 |
| 2015/0277115 A1 | 10/2015 | Inamoto et al. | |
| 2016/0147061 A1 | 5/2016 | Nambara | |
| 2017/0052380 A1* | 2/2017 | Horikawa | G02B 3/0056 |

FOREIGN PATENT DOCUMENTS

| | | |
|---|---|---|
| JP | 2013-164512 A | 8/2013 |
| JP | 2014-139655 A | 7/2014 |
| JP | 2015-004825 A | 1/2015 |

* cited by examiner (a)

(b)

(a)

(b)

HEAD-UP DISPLAY DEVICE AND LENS UNIT

CROSS REFERENCE

This application is the U.S. National Phase under 35 U.S.C. § 371 of International Application No. PCT/JP2017/001166, filed on Jan. 16, 2017, which claims the benefit of Japanese Application No. 2016-007850, filed on Jan. 19, 2016, the entire contents of each are hereby incorporated by reference.

TECHNICAL FIELD

The present invention relates to a head-up display device and a lens unit.

BACKGROUND ART

As a head-up display device for displaying information on a windshield of a vehicle and the like, a head-up display device disclosed in Patent Literature 1 is known. The head-up display device includes a plurality of light sources mounted on a wiring substrate and a lens unit having a plurality of convex lens portions formed to face each light source. According to the head-up display device, radiant light radiated from each light source is collected by each convex lens portion opposing the light source, and thus the radiant light can be efficiently collected.

However, there is a problem in the head-up display device described in the Patent Literature 1 that a sharp valley is formed between adjacent convex lens portions and the radiant light from adjacent light sources is superimposed in the valley and emitted, and thus unevenness occurs in the luminance of the emitted light emitted from the lens unit.

As a display device for solving this problem, a display device disclosed in Patent Literature 2 is known. In the lens unit of the head-up display device, superimposition of the emitted light is suppressed and occurrence of unevenness in luminance is suppressed by providing a connection portion at the boundary between the adjacent convex lens portions.

CITATION LIST

Patent Literature

PTL 1: JP-A-2013-164512
PTL 2: JP-A-2009-122654

SUMMARY OF INVENTION

Technical Problem

The head-up display device disclosed in the Patent Literature 2 is based on the premise that the light sources are arranged at the same interval in the row direction and in the column direction. However, there are cases where it is necessary to make the interval in the row direction different from the interval in the column direction of the light sources due to the structure of the device, the characteristics of the light sources, etc. In the display device described in the Patent Literature 2, there is a problem that, when the intervals of the light sources and the convex lens portions arrayed in matrix are made different between rows and columns, the emitted light emitted from the connection portions in rows or columns is superimposed and unevenness occurs in luminance.

The invention has been made in view of the above circumstances, and an object of the invention is to provide a head-up display device and a lens unit, in which luminance unevenness of emitted light emitted from the lens unit is small even when intervals of light sources arrayed in matrix are different between rows and columns.

Solution To Problem

In order to achieve the above object, the head-up display device of the invention comprises
 a plurality of light sources arrayed in matrix in a first direction and a second direction orthogonal to the first direction on a substrate, and
 a lens unit in which convex lens portions which collect radiant light radiated from the light sources are formed opposing each light source,
 the plurality of light sources are arranged at a first arrangement interval in the first direction and are arranged at a second arrangement interval, which is smaller than the first arrangement interval, in the second direction,
 the lens unit includes a first connection portion and a second connection portion formed at boundaries of the adjacent convex lens portions,
 the first connection portion extends in the first direction,
 the second connection portion extends in the second direction,
 and a width of a short direction of the first connection portion is larger than a width of a short direction of the second connection portion.

In order to achieve the above object, the lens unit of the invention is
 a lens unit which collects and outputs light from light sources arrayed in matrix, wherein
 the lens unit includes a lens array in which convex lens portions, which are formed opposing each light source and collect radiant light radiated from the opposed light sources, are formed in matrix,
 the convex lens portions are arranged at a first arrangement interval in a first direction and are arranged at a second arrangement interval, which is smaller than the first arrangement interval, in a second direction,
 the lens array includes a first connection portion and a second connection portion formed at boundaries of the adjacent convex lens portions,
 the first connection portion extends in the first direction,
 the second connection portion extends in the second direction,
 and a width of a short direction of the first connection portion is larger than a width of a short direction of the second connection portion.

Advantageous Efffects of Invention

According to the invention, it is possible to suppress occurrence of unevenness in luminance of emitted light emitted from the lens unit in a lens unit in which convex lens portions are arranged in matrix with intervals different between rows and columns.

DESCRIPTION OF EMBODIMENTS

An embodiment of the head-up display device according to the invention will be described with reference to the drawings. For a better understanding of the configuration of the head-up display device, description will be made using XYZ coordinates in which the travelling direction of the vehicle is the X direction, the width direction of the vehicle is the Y direction, and the vertical direction is the Z direction. In addition, the directions pointed by arrows of X, Y, Z coordinates are defined as + (plus), and the opposite directions are defined as − (minus).

Figure 1:
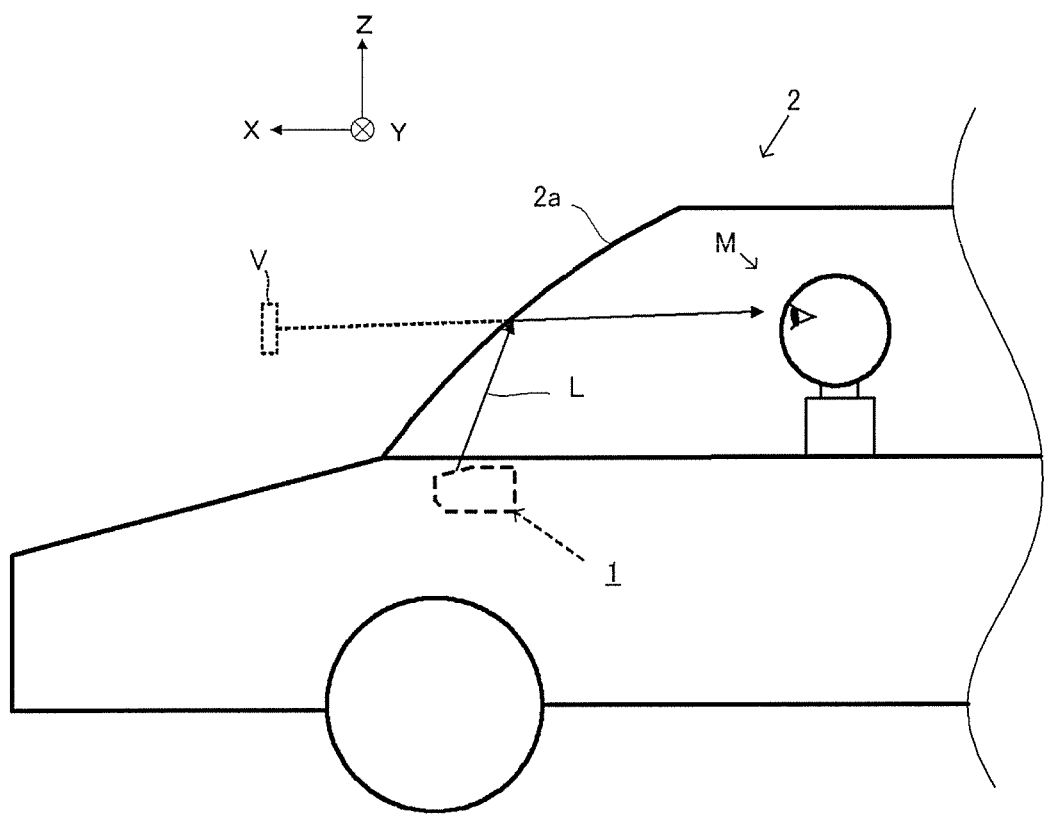
FIG. 1 is a schematic view of a vehicle on which a head-up display device according to an embodiment of the invention is mounted.

A head-up display device 1 according to the present embodiment is, as shown in FIG. 1, a display device which is installed in a dashboard of a vehicle 2 and irradiates a windshield 2a (a projection member) with a display light L. The display light L is reflected by the windshield 2a toward an operator M and is visually recognized by the operator M as a virtual image V.

Figure 2:
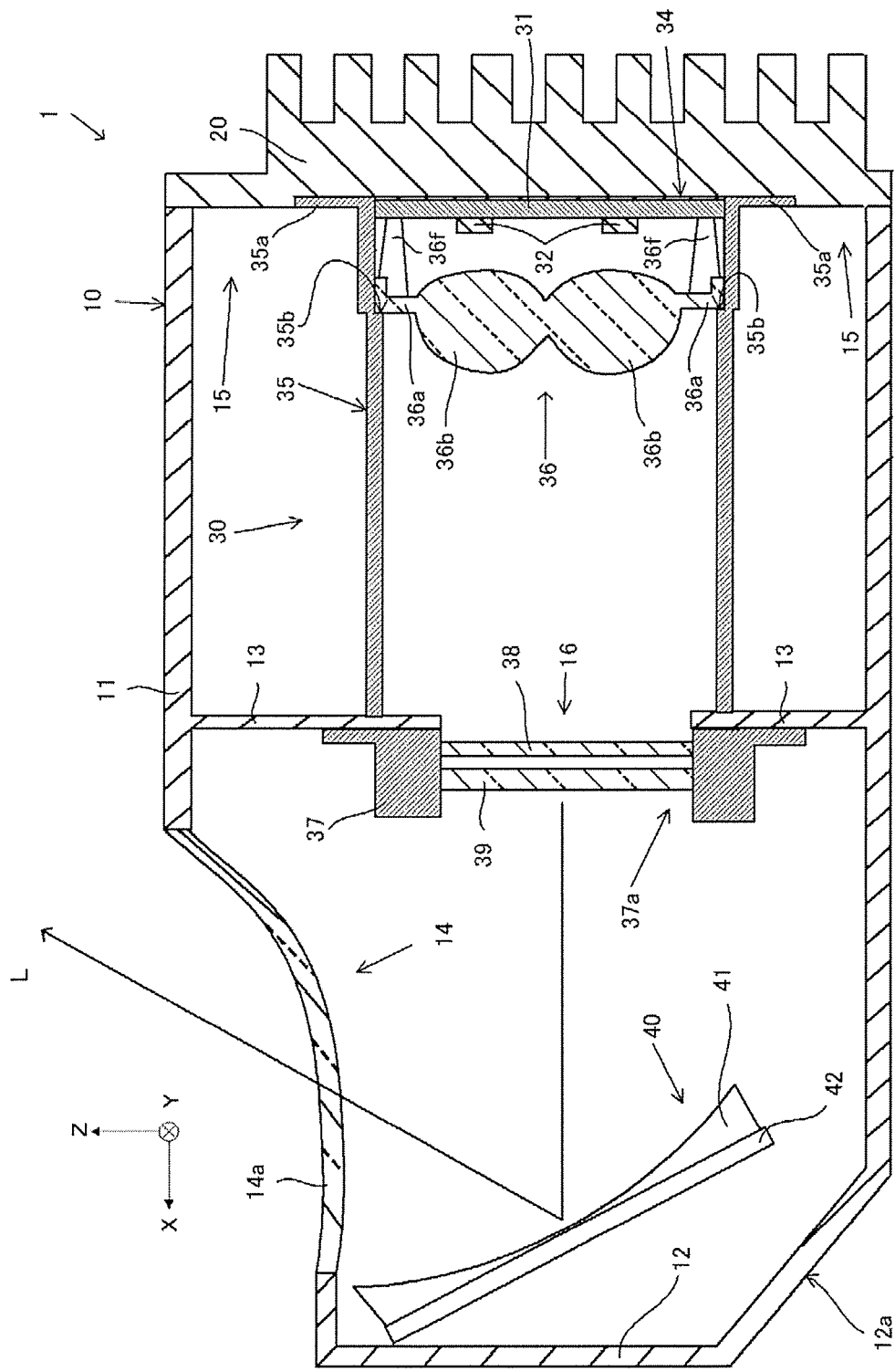
FIG. 2 is a cross-sectional view of a head-up display device according to an embodiment.

As shown in FIG. 2, the head-up display device 1 includes a housing 10, a heat sink 20, a display unit 30 and a reflector 40.

The housing 10 is a non-light-transmissive case in a rectangular cylinder shape and is formed with a non-light-transmissive resin material or a metal material. A rectangular cylinder portion 11, a front side plate portion 12, a partition wall portion 13, an upper side opening portion 14, a rear side opening portion 15 and a partition wall opening portion 16 are formed in the housing 10.

The rectangular cylinder portion 11 is a portion in a rectangular cylinder shape. The upper side opening portion 14 is obliquely formed in the +Z portion in the +X direction of the rectangular cylinder portion 11.

The front side plate portion 12 is a portion which forms the +X surface of the housing 10. An inclined portion 12a is formed in the −Z portion of the front side plate portion 12. In addition, since the upper side opening portion 14 is obliquely formed in the +Z portion of the front side plate portion 12, the width in the Z direction of the front side plate portion 12 is smaller than the width in the Z direction of the rectangular cylinder portion 11.

The partition wall portion 13 is a plate that partitions the interior of the rectangular cylinder portion 11 and is formed parallel to the YZ plane. The rectangular partition wall opening portion 16 is formed substantially at the center of the partition wall portion 13.

A light-transmissive cover 14a is fitted into the upper side opening portion 14 so as to close the upper side opening portion 14. The light-transmissive cover 14a is made with a light-transmissive synthetic resin material (for example, acrylic resin) and is formed in a curved shape (curved surface shape), and transmits the display light L reflected by the reflector 40 towards the windshield 2a.

The rear side opening portion 15 is a portion opened on the −X side of the housing 10. The heat sink 20 is attached to the rear side opening portion 15, and the −X side of the housing 10 is closed.

Figure 3:
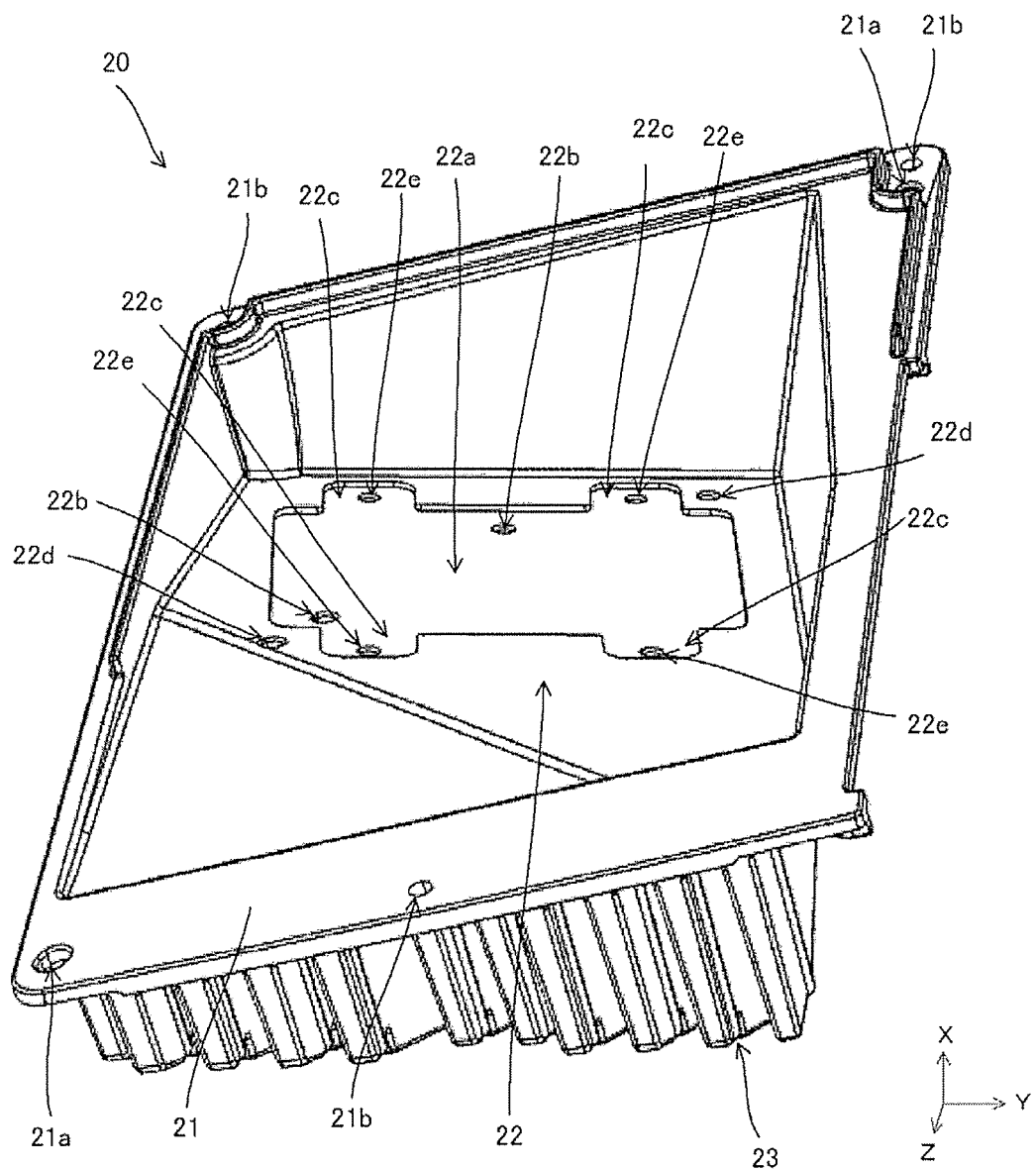
FIG. 3 is a perspective view of a heat sink of the head-up display device according to the embodiment.

The heat sink 20 is a heat radiating component for absorbing the heat released from the display unit 30 and discharging the heat to the outside, and is formed by aluminum and the like. As shown in FIG. 3, a housing attachment portion 21, a display unit attachment portion 22 and a fin portion 23 are formed in the heat sink 20.

The housing attachment portion 21 is a portion to which the housing 10 is attached, and it has a positioning hole 21a and a through hole 21b. A positioning pin (not shown) of the housing 10 is inserted into the positioning hole 21a to precisely position the housing 10 with respect to the heat sink 20. The through hole 21b is a through hole for inserting a screw (not shown) for attaching the housing 10.

The display unit attachment portion 22 is a portion to which the display unit 30 is attached, and it has a wiring substrate attachment portion 22a, a lens unit positioning hole 22b, a first case body fixing portion 22c, a first case body positioning hole 22d and a screw hole 22e.

The fin portion 23 is a portion formed on the back surface of the display unit attachment portion 22 and absorbing the heat released from the display unit 30 and discharging the heat to the outside, and a large number of protrusions are formed in the fin portion 23 in order to increase the surface area.

The display unit 30 is a device which emits the display light L, and has, as shown in FIG. 2, a wiring substrate 31, a light source 32, a connector 33 (see FIG. 4), a heat conduction sheet 34, a first case body 35, a lens unit 36, a second case body 37, a diffusion member 38 and a transmissive display element 39.

Figure 4:
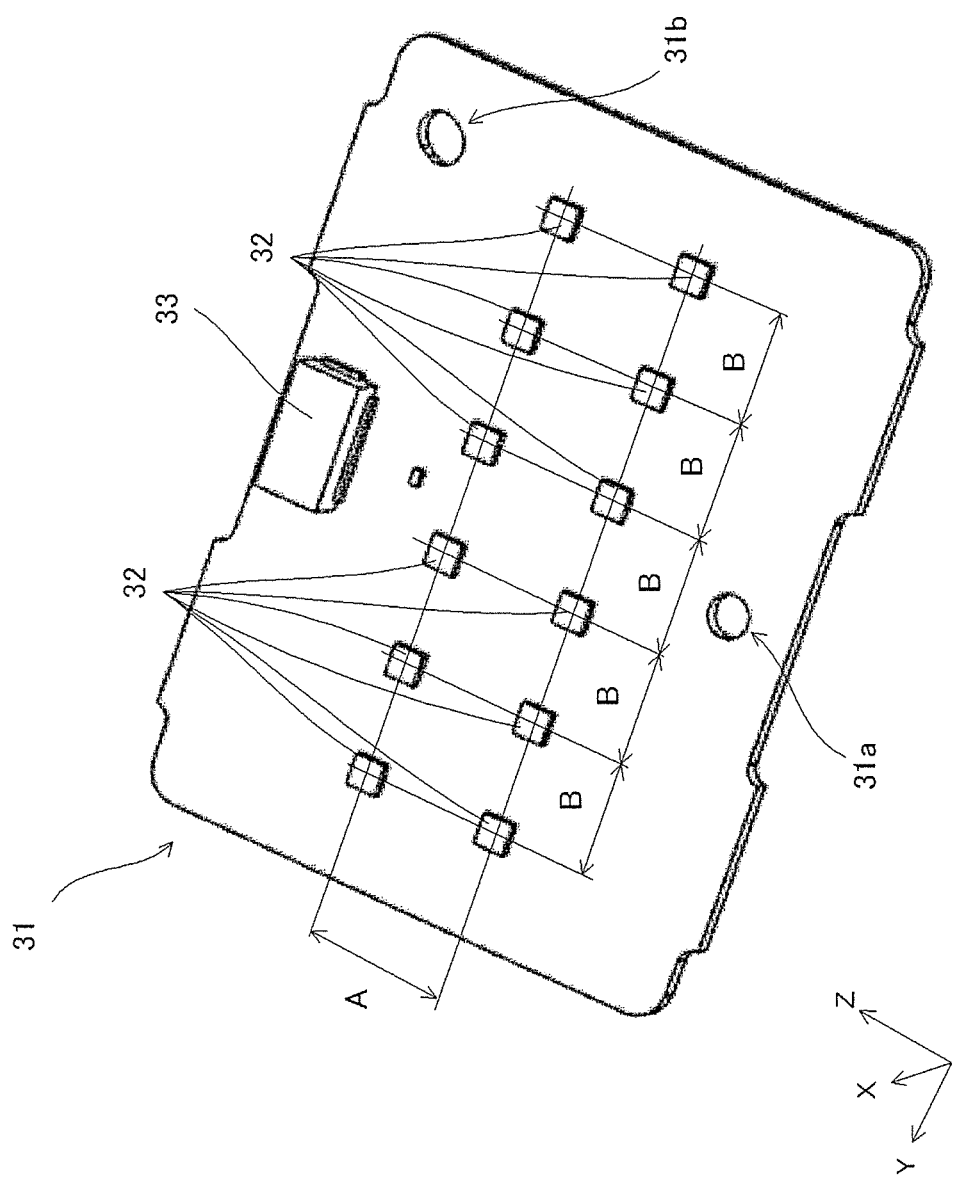
FIG. 4 is a perspective view of a wiring substrate of the head-up display device according to the embodiment.

The wiring substrate 31 is, for example, a rectangular flat plate formed of a thermally conductive insulating material provided with a predetermined wiring pattern, and as shown in FIG. 4, a plurality of light sources 32 and the connector 33 are mounted on the wiring pattern (+X side surface). In addition, a first positioning hole 31a and a second positioning hole 31b are formed in the wiring substrate 31. The first positioning hole 31a is a round hole and is formed in the center portion in the −Z direction of the wiring substrate 31. The second positioning hole 31b is a hole which is elongated in the center direction of the first positioning hole 31a, and is formed at the corner in the −Y direction of the +Z direction of the wiring substrate 31.

The light sources 32 are light emitting bodies such as an LED (Light Emitting Diode), have a light emitting surface in a rectangular shape in planar view having a certain effective area, for example, and are arranged on the wiring substrate 31 (+X surface) in a matrix having intervals different between rows and columns. Specifically, as shown in FIG. 4, the light sources 32 are arranged in two rows in the row direction (Z direction: a first direction) and are arranged in six columns in the column direction (Y direction: a second direction) perpendicular to the row direction, and the row interval (row pitch) A is larger than the column interval (column pitch) B.

The connector 33 is a component for electrically connecting the light sources 32 and a circuit board on which a CPU (Central Processing Unit) or the like which is not shown in the drawing is mounted, and is connected to an FPC (Flexible Printed Circuit) or the like not shown in the drawing.

The heat conduction sheet 34 shown in FIG. 2 is a sheet component which is made by combining a resin such as silicone and a ceramic filler or a metal filler and is excellent in heat conductivity and adhesion, and is formed in a shape substantially the same as the wiring substrate 31. The heat conduction sheet 34 is sandwiched by the wiring substrate 31 and the heat sink 20, and is adhered to the −X surface (see FIG. 4) of the wiring substrate 31 and the +X surface (see FIG. 3) of the wiring substrate attachment portion 22a of the heat sink 20.

The first case body 35 is a component in a rectangular cylinder shape formed with a non-light-transmissive resin material or the like, and is sandwiched by the heat sink 20 and the partition wall portion 13. A fixing portion 35a, a stepped surface 35b, and a positioning pin (not shown) are formed in the first case body 35.

The fixing portion 35a is a plate portion extending outward from the −X direction end of the first case body 35, and is attached to the first case body fixing portion 22c (see FIG. 3) of the heat sink 20. A through hole (not shown) is formed in the center of the fixing portion 35a, and by screwing a screw (not shown) inserted into the through hole into the screw hole 22e (see FIG. 3) of the heat sink 20, the first case body 35 is fixed to the heat sink 20. In this case, the positioning pin (not shown) formed in the first case body 35 is inserted into the first case body positioning hole 22d (see FIG. 3) of the heat sink 20, and the first case body 35 is precisely positioned with respect to the heat sink 20.

The stepped surface 35b is a surface formed by a step of the inner peripheral wall of the first case body 35, and is formed at a position contacting the +X surface of the lens unit 36 when the first case body 35 is fixed to the heat sink 20. The stepped surface 35b may not only be formed by processing a rectangular cylinder member but may also be formed by connecting two rectangular cylinder members having different widths of the inner peripheral surfaces.

Figure 5:
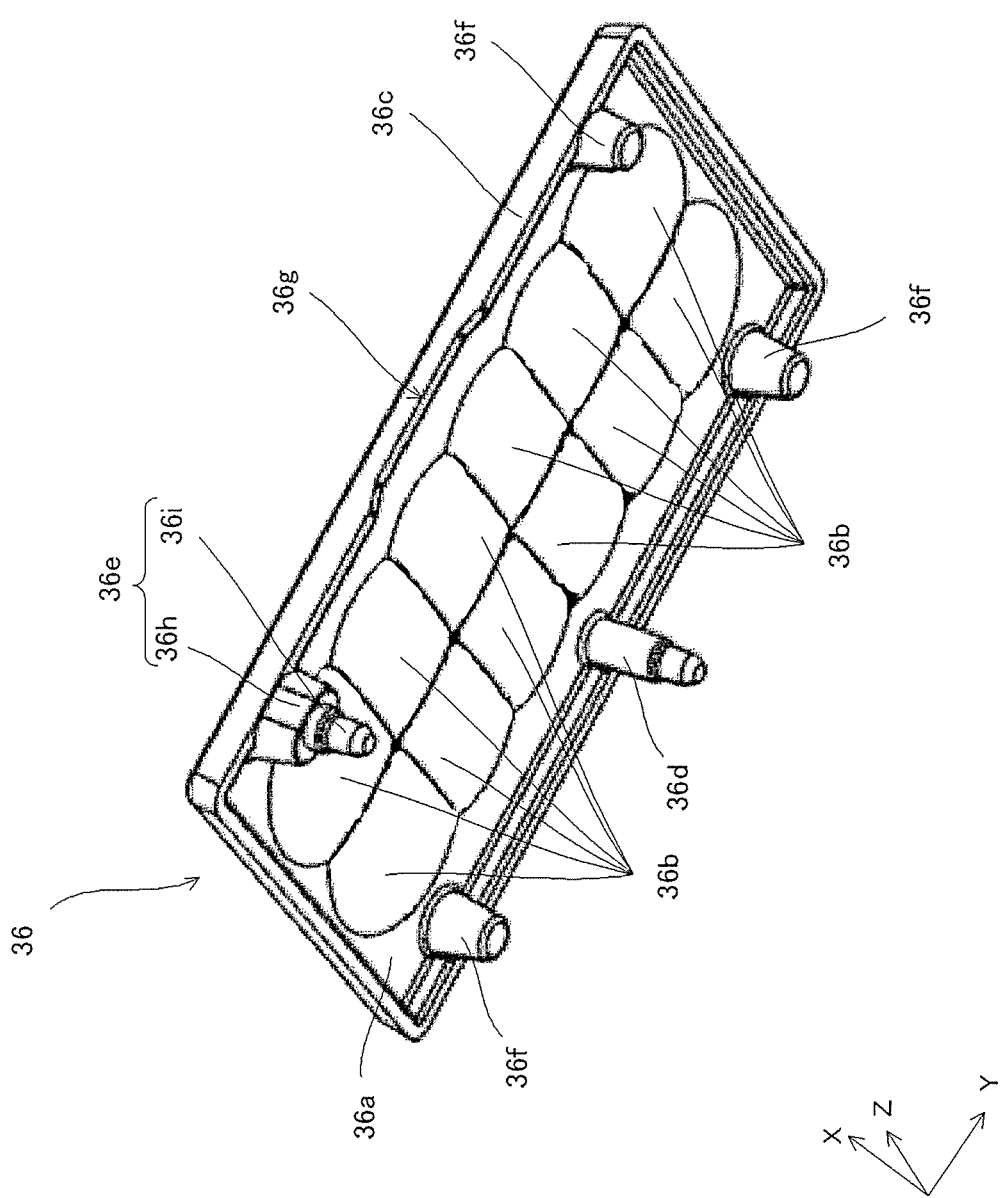
FIG. 5 is a perspective view of a lens unit of the head-up display device according to the embodiment.

The lens unit 36 is an optical element formed in a rectangular plate shape by a transparent optical resin or an optical glass, and includes, as shown in FIG. 5, a flat plate portion 36a, convex lens portions 36b, a reinforcing plate 36c, a first positioning pin 36d, a combined used protrusion 36e, and a first leg portion 36f.

The flat plate portion 36a is a rectangular flat plate, and a lens array in which the convex lens portions 36b are arrayed in a matrix shape with intervals different between rows and columns is formed in the center of the flat plate portion 36a. In addition, in the −X side surface (the surface opposing the light sources 32) of the flat plate portion 36a, the first positioning pin 36d and the combined used protrusion 36e and the first leg portion 36f are formed, and the reinforcing plate 36c extends in the −X direction from the outer periphery of the flat plate portion 36a.

Figure 6:
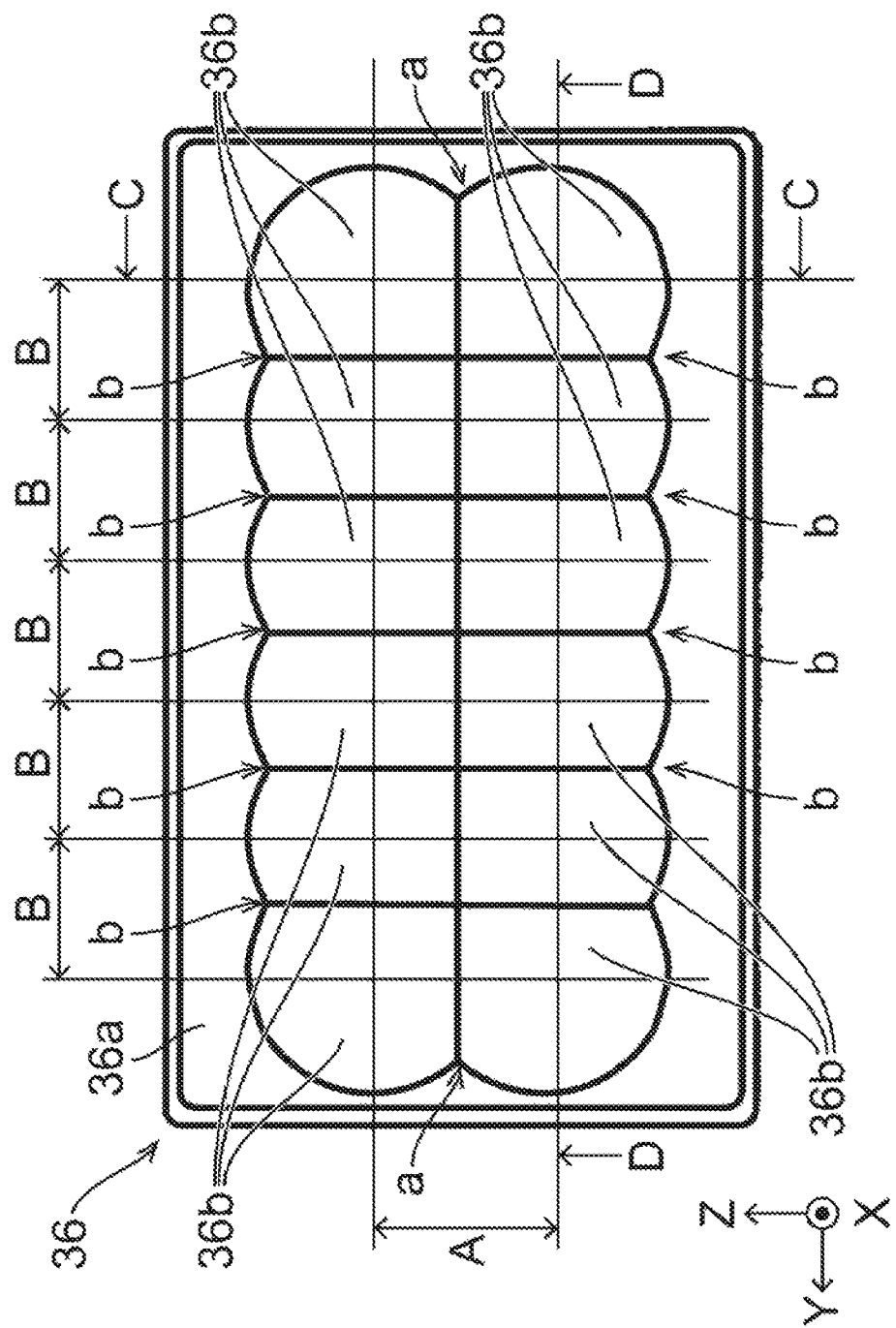
FIG. 6 is a plan view of the lens unit of the head-up display device according to the embodiment.

The convex lens portions 36b are convex lenses bulging from both surfaces of the flat plate portion 36a as shown in FIG. 2, and are formed in a matrix array having intervals different between rows and columns so as to oppose each of the light sources 32. Specifically, as shown in FIG. 6, the convex lens portions 36b are arranged in two rows in the row direction (Z direction: the first direction) and are arranged in six columns in the column direction (Y direction: the second direction) perpendicular to the row direction, and the row interval A is larger than the column interval B. In other words, the convex lens portions 36b are formed with the same row interval A and the same column interval B as the light sources 32 and oppose the light sources 32 respectively. As a result, each light source 32 and each convex lens portion 36b are superimposed in the X direction. Therefore, the radiant light radiated from each of the light sources 32 is irradiated to the opposing convex lens portion 36b and is efficiently collected (substantially collimated).

Moreover, connection portions a and b (connection portion a between rows and connection portion b between columns) are formed between the adjacent convex lens portions 36b on the upper surface (+X surface) of the lens unit 36. The connection portions a and b are portions that smoothly connect the surfaces of the adjacent convex lens portions 36b with curved lines, and the connection portion a extends in the column direction (Y direction: the second direction) and the connection portion b extends in the row direction (Z direction: the first direction).

Figure 7:
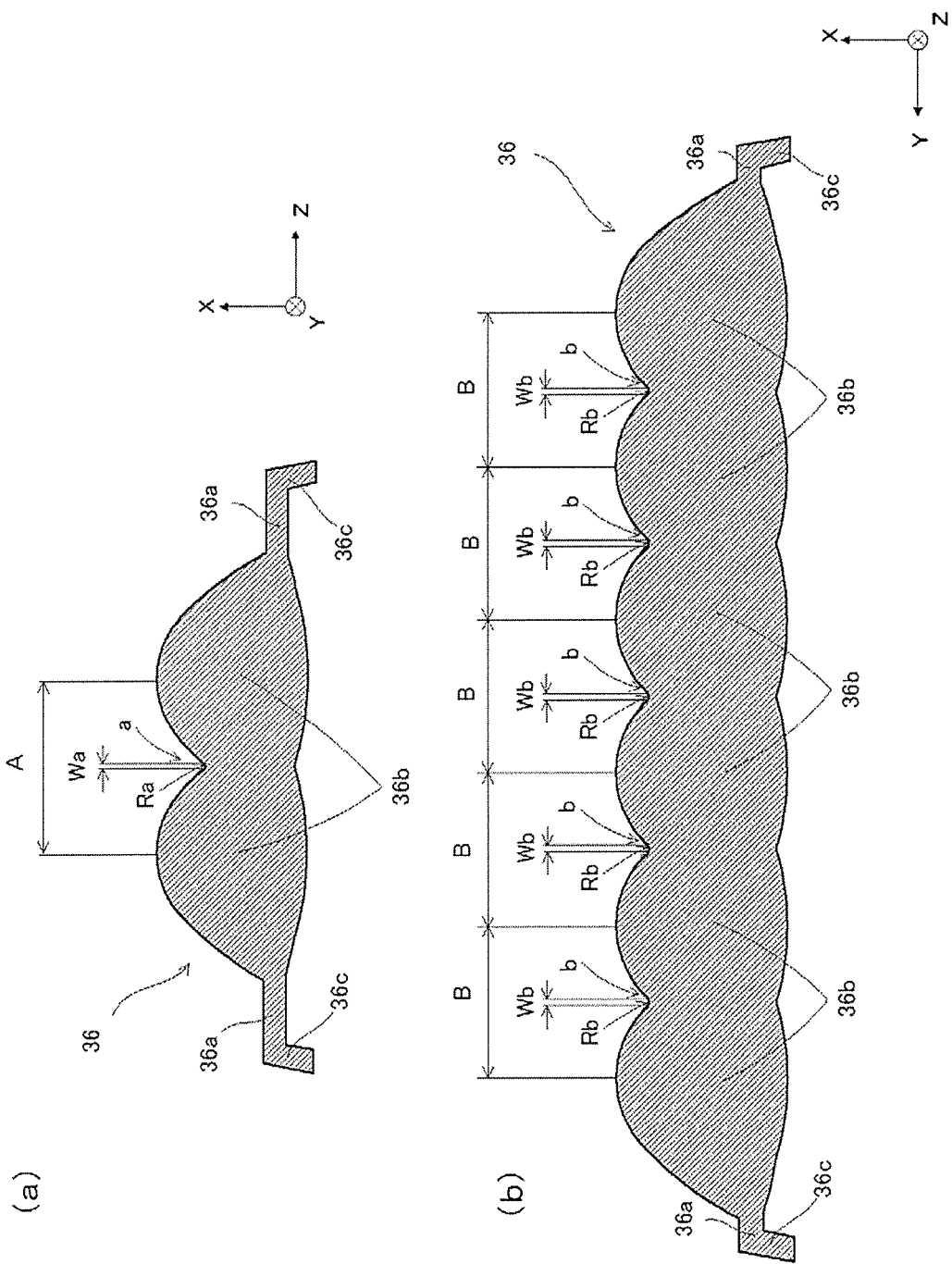
FIGS. 7 (a) and (b) are respectively a C-C cross-sectional view and a D-D cross-sectional view of the lens unit shown in FIG. 6.
Figure 8:
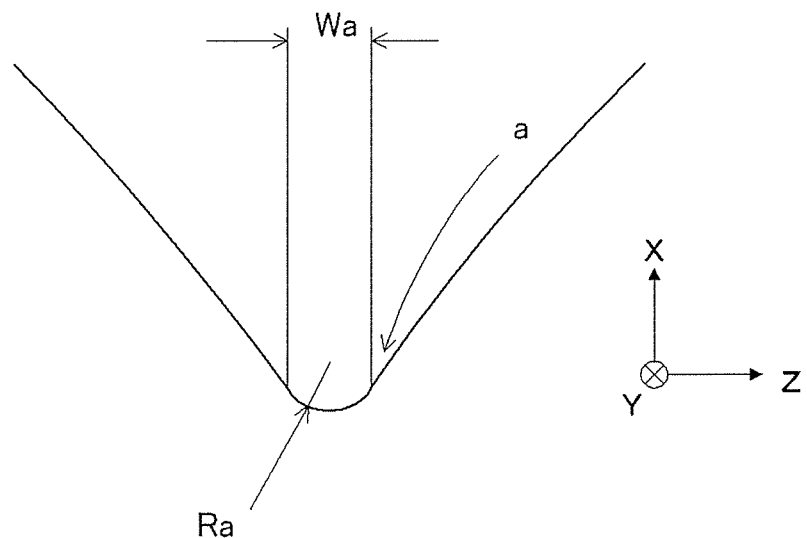
FIGS. 8 (a) and (b) are respectively enlarged cross-sectional views of FIGS. 7 (a) and (b).
Figure 8:
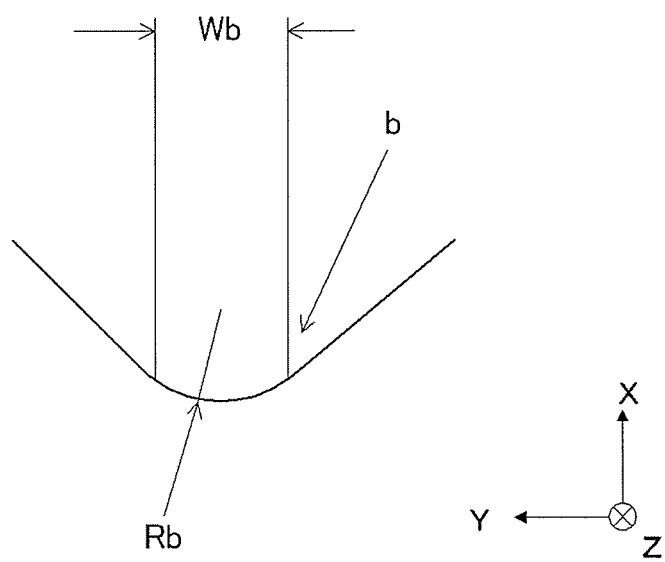

The cross-sectional shapes of the connection portions a and b are curved grooves as shown being enlarged in FIGS. 7 (a) and (b) and further in FIGS. 8 (a) and (b). As shown in FIGS. 8 (a) and (b), the connection portions a and b are formed such that a width Wa in a short direction of the connection portion a is smaller than a width Wb in a short direction of the connection portion b, and a curvature radius Ra of the connection portion a is smaller than a curvature radius Rb of the connection portion b.

As shown in FIG. 5, the reinforcing plate 36c is a plate extending in the −X direction from the outer periphery of the flat plate portion 36a, and it prevents the lens unit 36 from bending. In addition, a notched portion 36g for avoiding interference with the connector 33 mounted on the wiring substrate 31 is formed at the center of the +Z portion of the reinforcing plate 36c.

The first positioning pin 36d is a substantially conical protrusion formed at the center of the −Z portion of the −X side surface (the surface opposing the light sources 32) of the flat plate portion 36a, and is inserted into the first positioning hole 31a (see FIG. 4) of the wiring substrate 31, the through hole (not shown) of the heat conduction sheet 34, and the lens unit positioning hole 22b (see FIG. 3) of the heat sink 20.

The combined used protrusion 36e is a protrusion formed at the −Y corner of the +Z portion of the −X side surface (the surface opposing the light sources 32) of the flat plate portion 36a, and includes a second leg portion 36h shaped in elliptical frustum protruding from the flat plate portion 36a and a substantially conical second positioning pin 36i protruding from the second leg portion 36h. The second leg portion 36h is in contact with the +X surface of the wiring substrate 31, and the second positioning pin 36i is inserted into the second positioning hole 31b (see FIG. 4) of the wiring substrate 31, the through hole (not shown) of the heat conduction sheet 34, and the lens unit positioning hole 22b (see FIG. 3) of the heat sink 20. The second positioning hole 31b of the wiring substrate 31 is formed as an elongated hole, and thus the lens unit 36 can be assembled to the wiring substrate 31 even if a working error occurs in the wiring substrate 31 and the lens unit 36. In addition, even if the wiring substrate 31 expands due to the heat emitted from the light sources 32, the inner wall of the second positioning hole 31b does not press against the second positioning pin 36i. Therefore, the wiring substrate 31 can be prevented from bending.

The first leg portion 36f is a protrusion shaped in frustum, and is formed at three corners, except the −Y corner of the +Z portion where the combined used protrusion 36e is formed, of the four corners of the −X side surface (the surface opposing the light sources 32) of the flat plate portion 36a. As shown in FIG. 2, an end surface of the first leg portion 36f is in contact with the +X surface of the wiring substrate 31.

The first positioning pin 36d is inserted into the first positioning hole 31a of the wiring substrate 31, and the second positioning pin 36i is inserted into the second positioning hole 31b of the wiring substrate 31. In this way, the positional relations of the wiring substrate 31 and the lens unit 36 in the Y and Z directions are regulated. As a result, each light source 32 and each convex lens portion 36b can be superimposed in the X direction.

By bringing the end surfaces of the first leg portion 36f and the second leg portion 36h into contact with the +X surface of the wiring substrate 31, a distance between the light sources 32 and the convex lens portions 36b can be regulated to a predetermined value (5 mm or less). By fixing the first case body 35 to the heat sink 20, the stepped surface 35b of the first case body 35 comes into contact with the +X surface of the lens unit 36 and presses against the lens unit 36. In this way, the end surfaces of the first leg portion 36f and the second leg portion 36h of the lens unit 36 are in contact with the +X surface of the wiring substrate 31.

Further, by inserting the first positioning pin 36d and the second positioning pin 36i of the lens unit 36 into the lens unit positioning hole 22b (see FIG. 3) of the heat sink 20 respectively, the positional relations of the heat sink 20 and the lens unit 36 in the Y and Z directions are regulated. By inserting the positioning pin (not shown) of the first case body 35 into the first case body positioning hole 22d (see FIG. 3) of the heat sink 20, the positional relations of the heat sink 20 and the first case body 35 in the Y and Z directions are regulated. As a result, the positional relations of the first case body 35 and the lens unit 36 in the Y and Z direction are regulated.

The second case body 37 shown in FIG. 2 is a frame-shaped member in which a rectangular opening portion 37a is formed at the center, and the second case body 37 is formed with a non-light-transmissive resin material. The second case body 37 is fixed to the +X surface of the partition wall portion 13 such that the rectangular opening portion 37a and the partition wall opening portion 16 are superimposed. In addition, the diffusion member 38 and the transmissive display element 39 are fitted in the rectangular opening portion 37a and held.

The diffusion member 38 is a flat plate formed with a light transmissive synthetic resin having milky white color for example, and is disposed along the transmissive display element 39. The diffusion member 38 diffuses the emitted light emitted from the lens unit 36 and irradiates the transmissive display element 39.

The transmissive display element 39 is a device that displays an image by transmitted light, and is, for example, a light transmissive liquid crystal display panel in which polarizing films are provided on both surfaces of a liquid crystal cell in which liquid crystal is sealed in a pair of light-transmissive substrates. The transmissive display element 39 displays speed and engine speed based on output signals from a vehicle speed sensor and an engine rotation sensor. An image displayed by the transmissive display element 39 is transmissively illuminated by the emitted light emitted from the diffusion member 38 and irradiated to the reflector 40. Information displayed by the transmissive display element 39 is not limited to the vehicle speed and the engine speed and may be any information, for example, travelling distance information, navigation information, and outside air temperature information.

The reflector 40 is a device that reflects the display light L irradiated from the transmissive display element 39 and irradiates it to the windshield 2a, and has, as shown in FIG. 2, a concave mirror 41 and a mirror holder 42.

The concave mirror 41 is a mirror in which a reflection layer is vapor-deposited and formed on a resin substrate made with polycarbonate having a concave surface. The concave mirror 41 enlarges the display light L irradiated from the transmissive display element 39 and reflects it toward the light-transmissive cover 14a fitted into the upper side opening portion 14 of the housing 10. Therefore, the mirror holder 42 holding the concave mirror 41 is disposed to be inclined in the −Z portion in the +X direction inside the housing 10. The display light L reflected by the concave mirror 41 passes through the light-transmissive cover 14a and is irradiated on the windshield 2a.

According to the head-up display device 1 having the above configuration, the luminance of the emitted light irradiated from the light sources 32 arranged in a rectangular lattice shape to each convex lens portion 36b and emitted from the lens unit 36 can be equalized. Therefore, the path of light beams passing through the lens unit 36 of the head-up display device 1 according to an embodiment of the invention will be described in comparison with the path of light beams passing through a lens unit 56 of a conventional head-up display device.

As shown in FIG. 9 to FIG. 12, radiant light L1 radiated from the light sources 32 spreads to a predetermined width from a light emitting surface and is irradiated to the lens units 36 and 56. The radiant light L1 irradiated to the lens units 36 and 56 is collected in the +X direction by lens portions 36b and 56b opposing each light source 32 and is emitted from the lens units 36 and 56.

Figure 9:
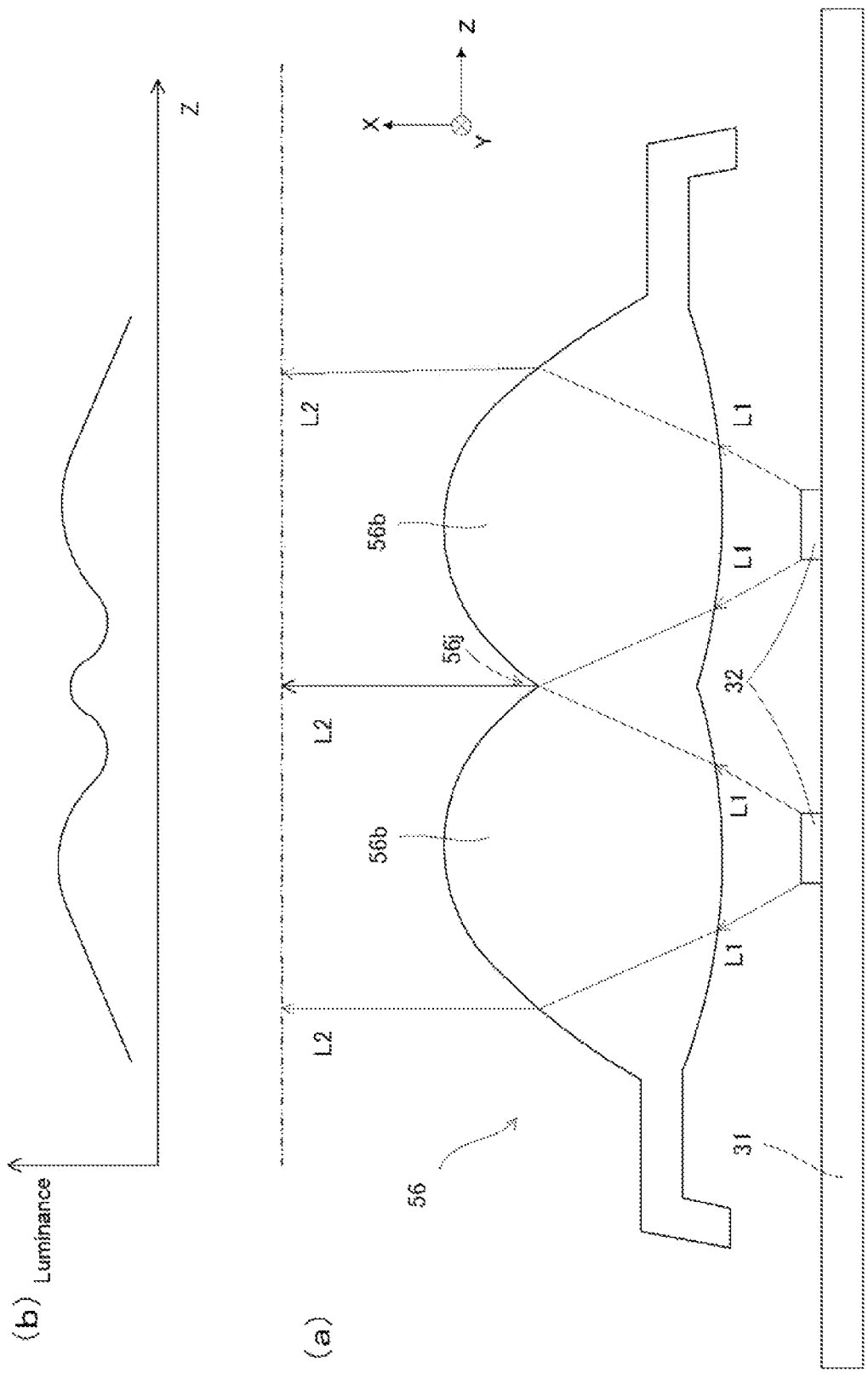
FIG. 9 (a) is a schematic view showing a path of light beams passing through a lens unit of a conventional head-up display device on the XZ plane, and (b) is a graph showing a relation between the luminance of emitted light emitted from the lens unit and the Z axis.
Figure 10:
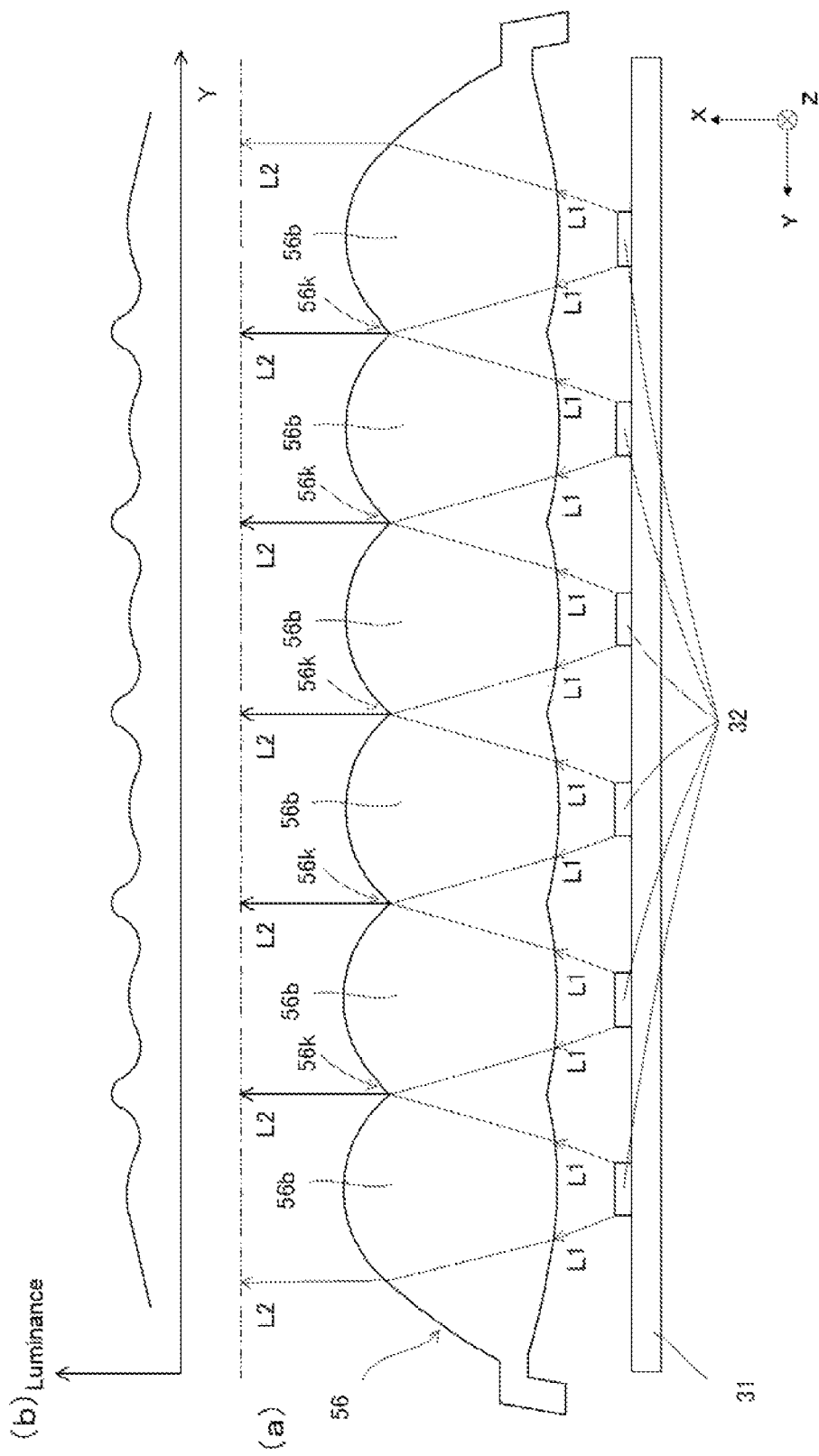
FIG. 10 (a) is a schematic view showing a path of light beams passing through a lens unit of a conventional head-up display device on the XY plane, and (b) is a graph showing a relation between the luminance of emitted light emitted from the lens unit and the Y axis.
Figure 11:
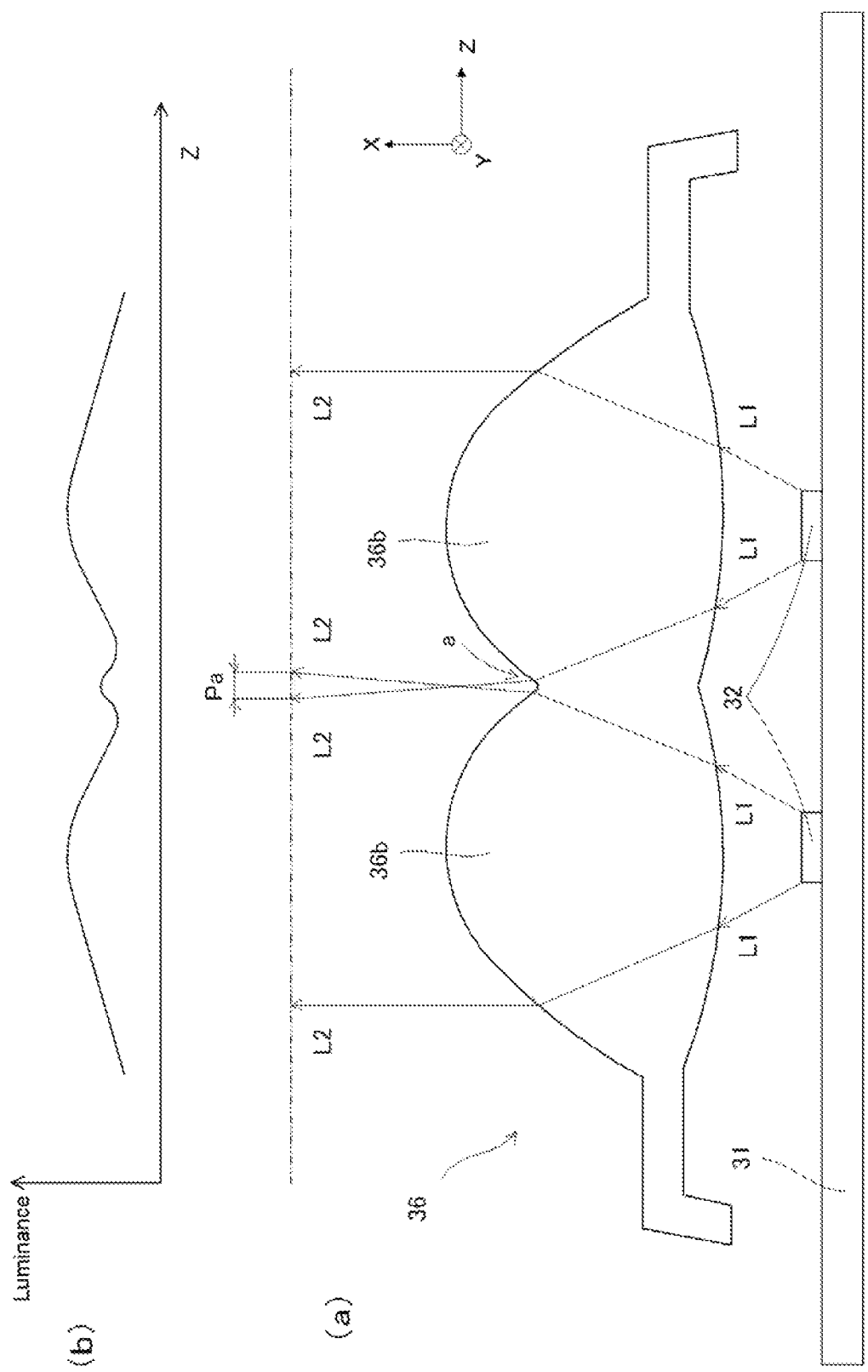
FIG. 11 (a) is a schematic view showing a path of light beams passing through the lens unit of the head-up display device according to the embodiment on the XZ plane, and (b) is a graph showing a relation between the luminance of emitted light emitted from the lens unit of the head-up display device according to the embodiment and the Z axis.
Figure 12:
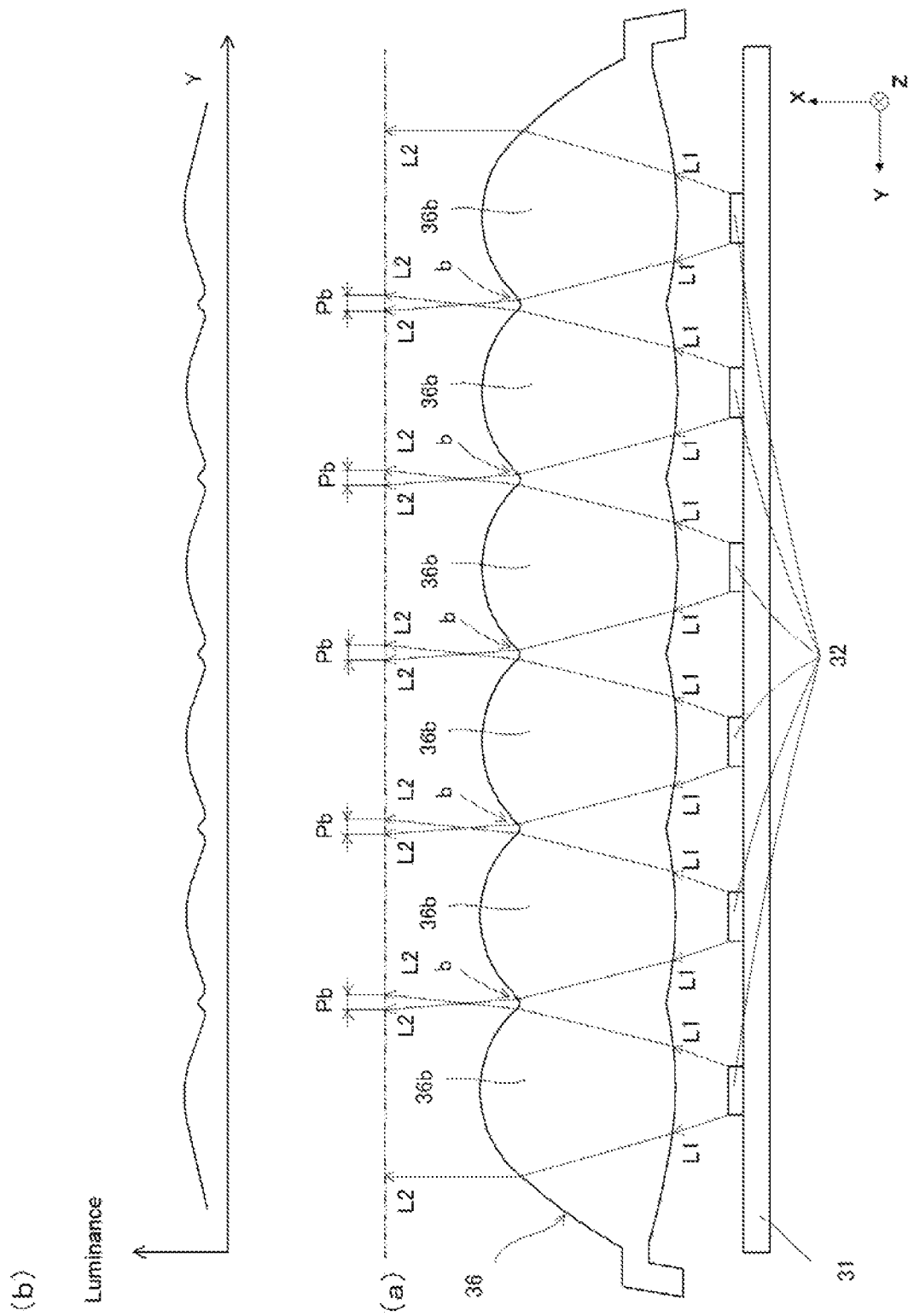
FIG. 12 (a) is a schematic view showing a path of light beams passing through a lens unit of a head-up display device according to an embodiment on the XY plane, and (b) is a graph showing a relation between the luminance of emitted light emitted from the lens unit of the head-up display device according to the embodiment and the Y axis.

In this case, as shown in FIG. 9 (a) and FIG. 10 (a), in the lens unit 56 of the conventional head-up display device, the radiant light L1 radiated from the adjacent light sources 32 is superimposed and emitted from valleys 56j and 56k of the adjacent lens portions 56b. Therefore, as shown in FIG. 9 (b) and FIG. 10 (b), the luminance of the emitted light L2 becomes high at the valleys 56j and 56k. Particularly, the luminance at the valley 56k of a column shown in FIG. 10 (b) is higher than the luminance at the center of the lens portion 56b and the luminance unevenness is remarkable because the interval B (see FIG. 6) of the light sources 32 is narrow and the amount of light irradiated from the adjacent light sources 32 is large.

In the lens unit 36 of the head-up display device 1 according to the embodiment of the invention, the connection portions a and b (see FIGS. 6 and 7) are formed between adjacent lens portions 36b. For this reason, the radiant light L1 radiated from the adjacent light sources 32 and entering the connection portions a and b is largely refracted due to the shapes of the connection portions a and b. Therefore, the emitted light L2 radiated from the connection portions a and b is largely refracted obliquely with respect to the X direction, does not reach the diffusion member 38 and does not contribute to illumination of the transmissive display element 39. As a result, the luminance of the emitted light L2 emitted from the lens unit 36 is equalized and unevenness is suppressed.

In addition, as shown in FIGS. 7 (a) and (b) and FIGS. 8 (a) and (b), the width Wa in the short direction of the connection portion a is smaller than the width Wb in the short direction of the connection portion b, and the curvature radius Ra of the connection portion a is smaller than the curvature radius Rb of the connection portion b. Therefore, a width Pa (see FIG. 11 (a)) of the emitted light L2 emitted from the connection portion a is equal to or larger than a width Pb (see FIG. 12 (a)) of the emitted light L2 emitted from the connection portion b. As a result, an effect of suppressing the luminance at the connection portion b larger than that at the connection portion a can be obtained, and thus the luminance of the emitted light L2 emitted from the lens unit 36 can be equalized and it becomes possible to suppress unevenness.

Effect

According to the embodiment described above, the following effects are obtained.

(1) The head-up display device 1 according to the embodiment includes the plurality of light sources 32 arrayed in matrix along the Y direction and the Z direction on the wiring substrate 31, and the lens unit 36 in which the convex lens portions 36b which collect the radiant light L1 radiated from the light sources 32 are formed opposing each light source 32. The plurality of light sources 32 are arranged at the interval A in the Z direction (the first direction: row direction) and arranged at the interval B, which is smaller than the interval A, in the Y direction (the second direction: column direction). Further, the lens unit 36 has the connection portions a and b formed at boundaries of the adjacent convex lens portions 36b. The connection portion a extends in the Y direction (the second direction: column direction), and the connection portion b extends in the Z direction (the first direction: row direction). The width Wa of the short direction of the connection portion a is smaller than the width Wb of the short direction of the connection portion b.

According to this configuration, the luminance of the emitted light L2 emitted from the lens unit 36 is equalized and unevenness can be suppressed.

(2) The connection portions a and b are formed by curved grooves. According to this configuration, it is possible not only to equalize the luminance of the emitted light L2 emitted from the lens unit 36 but also to increase the strength of the lens unit 36.

(3) The curvature radius Ra of the curved groove of the connection portion a is smaller than the curvature radius Rb of the connection portion b. Therefore, the emitted light L1 radiated to the connection portion b more than that to the connection portion a can be refracted more greatly and emitted, and the luminance of the emitted light L2 emitted from the lens unit 36 can be equalized.

(4) The wiring substrate 31 has the first positioning hole 31a which is a round hole, and the second positioning hole 31b which is an elongated hole formed elongated toward the first positioning hole 31a. The lens unit 36 has the first positioning pin 36d fitted into a first positioning hole 31a and the second positioning pin 36i fitted into the second positioning hole 31b, and a gap is formed between the second positioning hole 31b and the second positioning pin 36i fitted into the second positioning hole 31b. According to this configuration, the lens unit 36 can be assembled to the wiring substrate 31 even if a working error occurs in the wiring substrate 31 and the lens unit 36. In addition, even if the wiring substrate 31 expands due to the heat emitted from the light sources 32, the inner wall of the second positioning hole 31b does not press against the second positioning pin 36i. Therefore, the wiring substrate 31 can be prevented from bending.

(5) A reinforcing plate which extends from the outer periphery of the lens unit and prevents the lens unit from bending is further provided. According to this configuration, the lens unit 36 can be prevented from bending by a simple structure.

(6) The notched portion 36g for avoiding interference with components such as the connector 33 mounted on the wiring substrate 31 is formed in the reinforcing plate 36c. According to this configuration, components such the connector 33 mounted on the wiring substrate 31 do not interfere with the reinforcing plate 36c because of the notched portion 36g, and thus the distance between the light sources 32 arranged on the wiring substrate 31 and the convex lens portions 36b formed in the lens unit 36 can be regulated to a predetermined value.

(7) The lens unit 36 according to the embodiment collects and outputs the light from the light sources 32 arrayed in matrix, and includes a lens array in which the convex lens portions 36b, which are formed opposing each of the light sources 32 and collect the radiant light radiated from the opposed light sources 32, are formed in matrix. The convex lens portions 36b are arranged at a first arrangement interval (A) in a first direction (Z direction) and are arranged at a second arrangement interval (B), which is smaller than the first arrangement interval (A), in a second direction (Y direction). The lens array includes a first connection portion (b) and a second connection portion (a) formed at boundaries of the adjacent convex lens portions 36b. The first connection portion (b) extends in the first direction (Z direction), and the second connection portion (a) extends in the second direction (Y direction). A width (Wb) of a short direction of the first connection portion (b) is larger than a width (Wa) of a short direction of the second connection portion (a).

According to this configuration, the luminance of the emitted light L2 emitted from the lens unit 36 is equalized and it becomes possible to suppress unevenness.

Variation

The invention is not limited by the above embodiment and the drawings. Variations (including deletion of constituent elements) can definitely be added to the above embodiment and drawings.

In the above description, an example in which the convex lens portions 36b bulge from both surfaces of the flat plate portion 36a of the lens unit 36 has been shown. However, the invention is not limited thereto. For example, the surface (−X surface) opposing the light sources 32 may be a flat surface.

In the above description, an example in which the connection portions a and b are formed at the boundaries of the convex lens portions 36b on the +X surface of the lens unit 36 has been shown. However, the invention is not limited thereto. For example, the connection portions a and b may be formed not only on the +X surface of the lens unit 36 but also at the boundaries of the convex lens portions 36b on the −X surface.

In the above description, the interval A of the light sources 32 and the convex lens portions 36b in the row direction (Z direction: the first direction) is larger than the interval B in the column direction (Y direction: the second direction). At the boundaries of the convex lens portions 36b, the curvature radius Ra of the connection portion a extending in the column direction (Y direction: the second direction) is smaller than the curvature radius Rb of the connection portion b extending in the row direction (Z direction: the first direction). However, the invention is not limited thereto. For example, the interval A of the light sources 32 and the convex lens portions 36b in the row direction may be smaller than the interval B in the column direction, and at the boundaries of the convex lens portions 36b, the curvature radius Ra of the connection portion a extending in the column direction may be larger than the curvature radius Rb of the connection portion b extending in the row direction.

Figure 13:
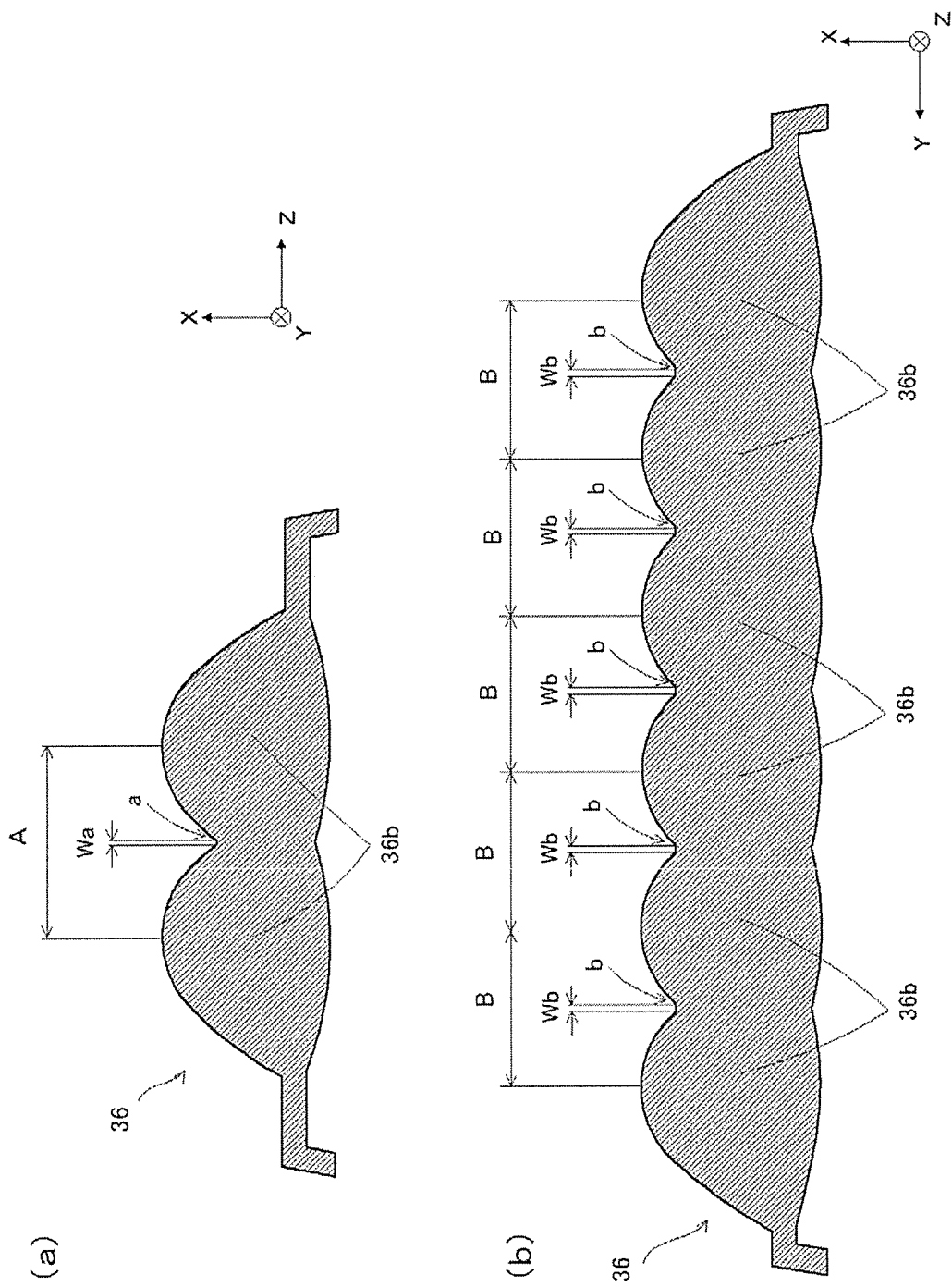
FIG. 13 (a) is a C-C cross-sectional view and (b) is a D-D cross-sectional view of a lens unit according to another embodiment.
Figure 14:
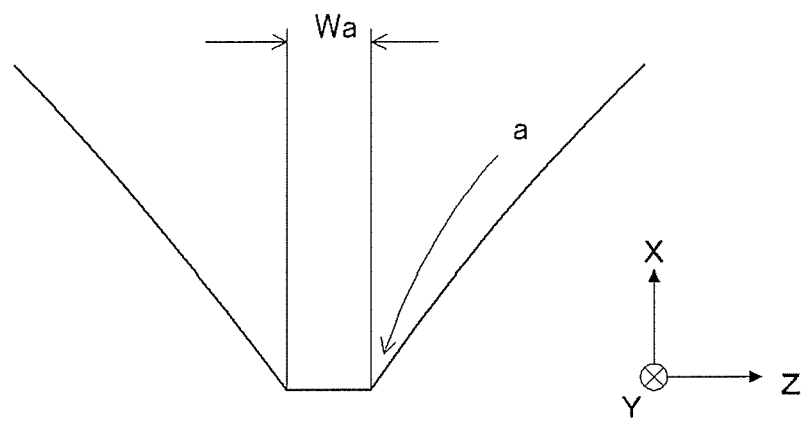
FIGS. 14 (a) and (b) are respectively enlarged cross-sectional views of FIGS. 13 (a) and (b).
Figure 14:
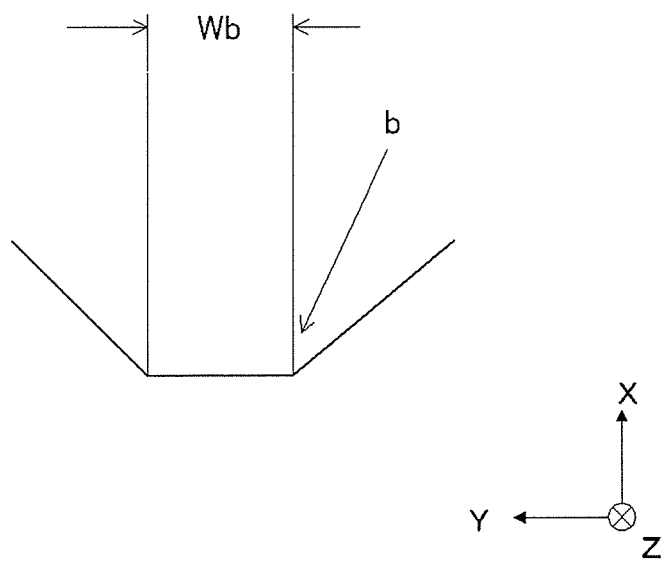

In the above description, the cross-sectional shapes of the connection portions a and b are curved grooves. However, the invention is not limited thereto. For example, as shown in FIGS. 13 (a) and (b) and FIGS. 14 (a) and (b), the cross-sectional shapes of the connection portions a and b may be made flat. Also in this case, it is formed such that, at the boundaries of the convex lens portions 36b, the width Wa of the short direction of the connection portion a extending in the column direction is smaller than the width Wb of the short direction of the connection portion b extending in the row direction when the interval A of the light sources 32 and the convex lens portions 36b in the row direction is larger than the interval B in the column direction, and Wa is larger than Wb when A is smaller than B.

In the above description, an example in which the display unit 30 only has the lens unit 36 as a lens collecting the display light L has been shown. However, the invention is not limited thereto. For example, a lens such as a cylindrical lens may be disposed between the lens unit 36 and the diffusion member 38 to further equalize the luminance of the radiant light irradiated to the transmissive display element 39.

An example in which the head-up display device 1 is installed in the vehicle 2 has been shown in the above description. However, the invention is not limited thereto. The head-up display device 1 can also be installed in other conveyances such as watercraft and aircraft. Moreover, the head-up display device is not limited to those installed in a conveyance, and it can also be applied to tabletop interiors and the like installed indoors.

In the above description, descriptions of well-known technical matters have been appropriately omitted for a better understanding of the invention.

INDUSTRIAL APPLICABILITY

The invention is suitable for a head-up display device mounted on a vehicle.

REFERENCE SIGNS LIST

1: head-up display device
31: wiring substrate
31a: first positioning hole
31b: second positioning hole
32: light source
36: lens unit
36b: convex lens portion
36c: reinforcing plate
36d: first positioning pin
36i: second positioning pin
36g: notched portion
A: interval in row direction
B: interval in column direction
a: connection portion extending in column direction
b: connection portion extending in row direction
L1: radiant light
Wa: width of short direction of connection portion a extending in column direction
Wb: width of short direction of connection portion b extending in row direction
Ra: curvature radius of curved groove of connection portion a
Rb: curvature radius of curved groove of connection portion b

The invention claimed is:

1. A head-up display device comprising:
a plurality of light sources in matrix in a first direction and a second direction orthogonal to the first direction on a substrate, wherein the plurality of light sources are arranged at a first arrangement interval in the first direction and are arranged at a second arrangement interval in the second direction, wherein the second arrangement interval is smaller than the first arrangement interval; and
a lens unit comprising 1) convex lens portions in matrix, 2) a first connection portion formed at a boundary of two adjacent columns of the convex lens portions, and 3) a second connection portion formed at a boundary of two adjacent rows of the convex lens portions, wherein the convex lens portions and the plurality of light sources are formed to respectively oppose each other so that the convex lens portions collect radiant light radiated from the respective light sources,
a longitudinal axis of the first connection portion extends in the first direction,
a longitudinal axis of the second connection portion extends in the second direction, and
a width in a short direction of the first connection portion is larger than a width in a short direction of the second connection portion.

2. The head-up display device according to claim 1, wherein the first connection portion and the second connection portion are formed by curved grooves.

3. The head-up display device according to claim 2, wherein a curvature radius of the curved groove of the first connection portion is larger than a curvature radius of the curved groove of the second connection portion.

4. The head-up display device according to claim 1, wherein
the substrate has 1) a round hole and 2) an elongated hole elongated towards the round hole,
the lens unit has 1) a first positioning pin to be fitted into the round hole and 2) a second positioning pin to be fitted into the elongated hole, and when the second positioning pin is fitted into the elongated hole, a gap is formed between the elongated hole and the second positioning pin.

5. The head-up display device according to claim 1, further comprising a reinforcing plate disposed on an outer periphery of the lens unit to prevent the lens unit from bending,
wherein the reinforcing plate protrudes from the lens unit such that when the lens unit is assembled onto the substrate, the reinforcing unit extends in a direction of the substrate.

6. The head-up display device according to claim 5, wherein the reinforcing plate includes a notched portion for avoiding interference with components mounted on the substrate when the lens unit is assembled onto the substrate.

7. A lens unit which collects and outputs light from light sources arrayed in matrix, the lens unit comprising:
convex lens portions in matrix, wherein the convex lens portions and light sources are formed to respectively oppose each other so that the convex lens portions collect radiant light radiated from the respective light sources, wherein the convex lens portions are arranged at a first arrangement interval in a first direction and are arranged at a second arrangement interval in a second direction, wherein the second arrangement interval is smaller than the first arrangement interval;
a first connection portion formed at a boundary of two adjacent columns of the convex lens portions; and
a second connection portion formed at a boundary two adjacent rows of the convex lens portions,
wherein a longitudinal axis of the first connection portion extends in the first direction,
wherein a longitudinal axis of the second connection portion extends in the second direction, and
wherein a width in a short direction of the first connection portion is larger than a width of a short direction in the second connection portion.

8. The head-up display device according to claim 2, wherein
the substrate has 1) a round hole and 2) an elongated hole elongated towards the round hole,
the lens unit has 1) a first positioning pin to be fitted into the round hole and 2) a second positioning pin to be fitted into the elongated hole, and
when the second positioning pin is fitted into the elongated hole, a gap is formed between the elongated hole and the second positioning pin.

9. The head-up display device according to claim 3, wherein
the substrate has 1) a round hole and 2) an elongated hole elongated towards the round hole,
the lens unit has 1) a first positioning pin to be fitted into the round hole and 2) a second positioning pin to be fitted into the elongated hole, and
when the second positioning pin is fitted into the elongated hole, a gap is formed between the elongated hole and the second positioning pin.

10. The head-up display device according to claim 2, further comprising a reinforcing plate disposed on an outer periphery of the lens unit to prevent the lens unit from bending,
wherein the reinforcing plate protrudes from the lens unit such that when the lens unit is assembled onto the substrate, the reinforcing unit extends in a direction of the substrate.

11. The head-up display device according to claim 3, further comprising a reinforcing plate disposed on an outer periphery of the lens unit to prevent the lens unit from bending,
wherein the reinforcing plate protrudes from the lens unit such that when the lens unit is assembled onto the substrate, the reinforcing unit extends in a direction of the substrate.

12. The head-up display device according to claim 4, further comprising a reinforcing plate disposed on an outer periphery of the lens unit to prevent the lens unit from bending,
wherein the reinforcing plate protrudes from the lens unit such that when the lens unit is assembled onto the substrate, the reinforcing unit extends in a direction of the substrate.

* * * * *